United States Patent [19]
Booker et al.

[11] Patent Number: 5,639,099
[45] Date of Patent: Jun. 17, 1997

[54] CONSTANT VELOCITY JOINT SEAL

[75] Inventors: Danny Lee Booker, Troy; Richard Daniel Frazer, Escanaba, both of Mich.

[73] Assignee: GKN Automotive, Inc., Auburn Hills, Mich.

[21] Appl. No.: 575,551

[22] Filed: Dec. 20, 1995

[51] Int. Cl.⁶ ........................................ F16J 15/32
[52] U.S. Cl. .......................... 277/95; 277/152; 464/131; 464/139; 464/905; 464/906
[58] Field of Search .................. 277/95, 152; 464/131, 464/139, 905, 906

[56] References Cited

U.S. PATENT DOCUMENTS

| | | |
|---|---|---|
| 3,615,097 | 10/1971 | Malmstrom . |
| 3,713,659 | 1/1973 | Derman et al. . |
| 3,788,100 | 1/1974 | Pitner ................................ 277/95 |
| 3,825,272 | 7/1974 | Townsend . |
| 3,838,862 | 10/1974 | Fern . |
| 4,311,315 | 1/1982 | Kronenberg . |
| 4,580,996 | 4/1986 | Brissette . |
| 5,172,917 | 12/1992 | du Gay ................................ 277/152 |
| 5,230,658 | 7/1993 | Burton . |
| 5,299,982 | 4/1994 | Burton . |
| 5,356,158 | 10/1994 | Simmons et al. . |

*Primary Examiner*—William A. Cuchlinski, Jr.
*Assistant Examiner*—Christina Annick
*Attorney, Agent, or Firm*—GKN Automotive, Inc.

[57] ABSTRACT

A seal for use with a constant velocity joint and a transmission output component. The seal comprising a main seal body having a central axis of rotation, the main seal body including an inner wall and an outer wall and opposing first and second sides. The inner wall defining a connecting region having a generally cylindrical portion for connecting the seal to the transmission output component. A raised rib extending out from the first side of the seal, the raised rib being axially deformable in such a manner as to create an axial force parallel the axis of rotation for reducing the axial slip between the constant velocity joint and the transmission output component and a flange seal portion extending out away from the outer wall, the flange having an inner contacting surface adapts to contact the constant velocity joint and define a protective seal between the constant velocity joint and the transmission output component.

11 Claims, 4 Drawing Sheets

CONSTANT VELOCITY JOINT SEAL

TECHNICAL FIELD

The present invention relates to a seal for use with a universal joint and a transmission output component, and more particularly, to a biasing seal for use with a constant velocity joint and a transfer case output component.

BACKGROUND ART

U.S. Pat. No. 3,615,097 to Malmstrom discloses a seal for use between two chambers in which two different pressures prevail and which is separated by a wall through which a shaft passes. The seal comprises a body of rubber which is stretched round a shaft thereby fixing in the right position an integral and annular lip which presses axially along an annular sealing surface against the side of the wall where the prevailing pressure is highest by means of the inherent tension of the lip and due to the influence of the ambient pressure.

U.S. Pat. No. 3,825,272 to Townsend discloses a face seal for food processing equipment. The seal comprises a sealing element having a ring like metal backing member including an L-shaped cross section and a resilient seal attached to the backing member. The L-shaped cross section is defined by a first flange element engaging the bottom wall and a second flange element extending along the inner side wall and terminating in an outer edge spaced radially inwardly from the inner wall of the lip element.

U.S. Pat. No. 4,311,315 to Kronenberg discloses a shall seal made of a resiliently deformable elastomeric material. The seal comprises a seal body of annular form having an annular front face, an annular rear face, and an annular inner face. A sealing flange extends outwardly and forwardly from the front base of the seal body adjacent the inner face thereof. To reduce the tendency of the inner face seal body to move in an axial direction, the inner face of the seal body includes an annular concavely which operatively provides a suction cup effect more firmly to secure the seal body to the shaft.

The above described non-related seals fail to address the issues of unwanted axial slip between a universal joint and a transmission output component. More specifically in certain circumstances, a small amount of axial play or slip exists in the connection of a constant velocity joint and a transfer case output member in certain four wheel drive applications. This axial play may present problems during certain conditions. Over time as continual application of the braking system in the vehicle occurs, continual point contact may occur in the axial direction between the constant velocity joint and transfer case output components. This intermittent point contact may, over time, create unnecessary wear on the constant velocity joint outer race and transfer case output component interface.

Thus, it is desirable to provide a predetermined axial load or force between the constant velocity joint and the transfer case output component which forces the two components apart, eliminating axial motion. This axial load or force also provides a preload on the circuit connection on the stem of the constant velocity joint for better retention of the constant velocity joint within the transfer case output component. The constant velocity joint seal of the present invention solves the problems of the non-related prior art by providing the following characteristics.

SUMMARY OF THE INVENTION

A primary object of the present invention is to provide a seal for use with a universal joint and a transmission output component wherein the seal provides an axial force for reducing the axial slip between the universal joint and transmission output component.

Another object of the present invention is to provide a seal a for use with a constant velocity joint and a transmission output component wherein the seal comprises a main seal body having a central axis of rotation and including an inner wall and an outer wall and opposing first and second sides. The inner wall defines a connecting region having a generally cylindrical portion for connecting the seal to the transmission output component. The seal further includes a raised rib portion extending out from the first side which is axially deformable in a manner sufficient to create an axial force parallel to the axis of rotation of the seal for reducing the axial slip between the constant velocity joint and the transmission output component.

A further primary object of the present invention is to provide a seal for use with a universal joint and a transmission output component wherein the seal provides an axial force which forces the two components apart eliminating axial slip and reducing noise vibration and harshness generated.

Yet, another object of the present invention is to provide a seal for use with a constant velocity joint and a transmission output component wherein the seal includes a flange seal portion extending out away from the outer wall of the main seal body and the flange has an inner contacting surface adapted to contact the constant velocity joint and define a protective seal between the constant velocity joint and the transmission output component.

Yet, still another object of the present invention, is to provide a seal for use with a constant velocity joint and a transmission output component wherein the raised rib has a generally semi-circular cross section.

Yet, a further object of the present invention, is to provide a seal for use with a constant velocity joint and a transmission output component wherein a raised rib is located on a first side of the main seal body between the inner and outer walls.

Still yet, a further object of the present invention is to provide a seal for use with a constant velocity joint and a transmission output component wherein a raised rib extends out away from the second side of the main seal body.

Another further object of the present invention, is to provide a seal for use with a constant velocity joint and a transmission output component wherein the seal includes a flange seal portion having a frustoconical shape.

A still further object of the present invention is to provide a seal for use with a constant velocity joint and a transmission output component wherein a raised rib is axially deformable when operably attached to the transmission output component such that an axial force is created between the transmission output component and constant velocity joint in a range from 5 to 45 lbs.

Yet a further object of the present invention, is to provide a seal for use with a constant velocity joint and a transmission output component wherein the inner wall of the main body further includes a generally annular portion which extends radially inward toward the central axis of rotation of the seal.

Yet, still another object of the present invention, is to provide a seal for use with a constant velocity joint and a transmission output component wherein the generally annular portion of the seal is deformable in a direction perpendicular to the inner wall such that a compression force is created which assists in connecting the inner wall to the transmission output component.

It is yet another object of the present invention to provide a seal for use with a constant velocity joint and a transmission output component wherein the seal is a composite, including an elastomeric material and a supporting metallic or plastic structure.

It is still yet a further object of the present invention to provide a seal for use with a constant velocity joint having an outer race and an extending male spline connection and a transfer case output component having a corresponding female spline connection. The seal comprising a main seal body having a central axis of rotation and including an inner wall and an outer wall and opposing first and second sides. The inner wall defining an opening through which the transfer case output component is disposed. The inner wall also having a connecting region including a generally cylindrical portion adapted mate with a transfer case output component. A raised rib portion extends out from the first side of the main seal body and is axially deformable in such a manner so as to create an axial force parallel to the axis of rotation of the seal for reducing the axial slip between the constant velocity joint and the transfer case output component.

BEST MODE FOR CARRYING OUT THE INVENTION

Figure 1:
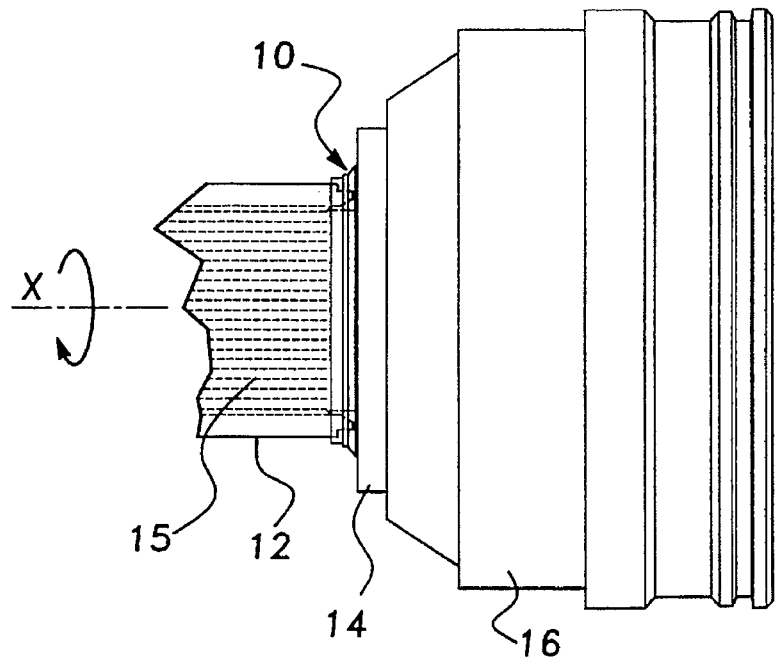
FIG. 1 is a side view of a constant velocity joint and transfer case output component, illustrating the constant velocity joint inserted into the transfer case output component and a seal of the present invention.
Figure 2:
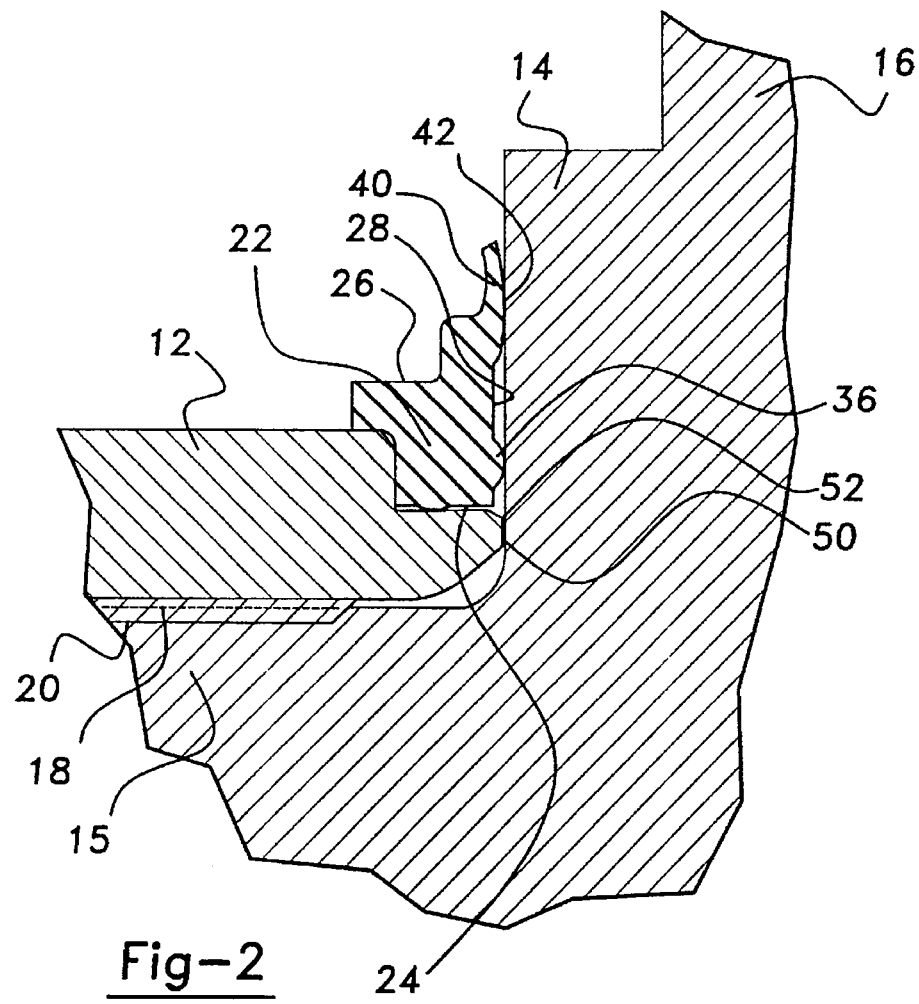
FIG. 2 is an enlarged, partially cut-away, cross sectional view of a seal of the present invention shown in FIG. 1.

Referring now to FIG. 1 there is shown generally, the seal 10 of the present invention. The seal 10 is shown operatively disposed around the transfer case output component 12. Transfer case output component 12 is shown in phantom engaged with the outer race 14 of constant velocity joint 16. The constant velocity joint 16 includes an inner race not shown and an extending male spline connection portion 18 as shown in FIG. 2. It is understood that the seal of the present invention may be adapted for use with any type of universal joint and transmission output component. The following specification describes the best mode for carrying out the invention using one type of universal joint, a constant velocity joint and one form of transmission output component, a transfer case output component exemplary purposes.

Transfer case output component 12 is shown having a female spline connection portion 20. Male spline connection 18 of constant velocity joint 16 and female spline connecting 20 of transfer case output component 12 are designed to correspondingly mate to each other and may include any known appropriate pitch and number of splines to adequately convey torque from the transfer case output component to the constant velocity joint.

Figure 3:
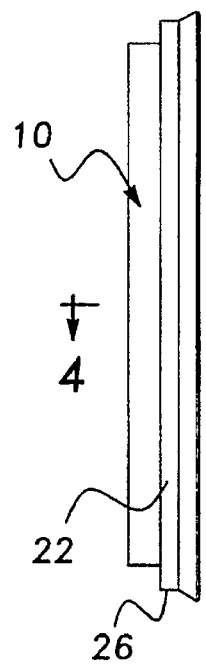
FIG. 3 is a side view of a seal of the present invention.
Figure 4:
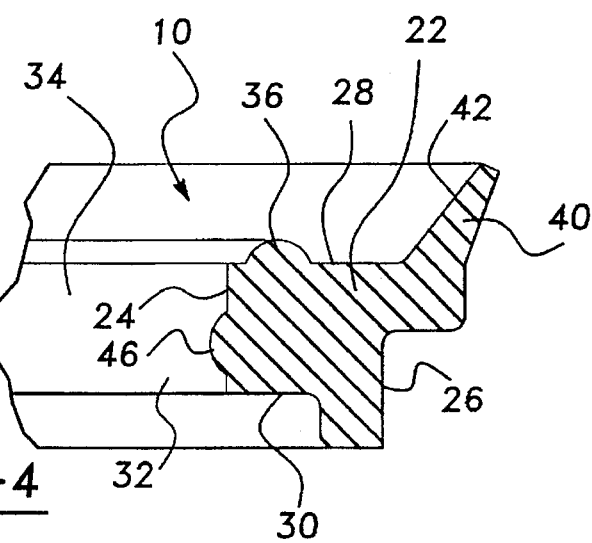
FIG. 4 is a cross sectional view of a seal of the present invention taken along lines 4—4 of FIG. 3.

Referring now to FIGS. 3 and 4, there is shown seal 10 of the present invention including a main seal body 22 having a central axis of rotation X. The main seal body 22 includes an inner wall 24 and an opposing outer wall 26. The main seal body 22 further includes a first side 28 and an opposing second side 30. The inner wall 24 defines a connecting region 32 having a generally cylindrical portion 34 which is designed to connect the seal 10 to the transfer case output component 12.

In FIGS. 2 and 4, there is shown a raised rib 36. Raised rib 36 extends out directly from first side 28 of main seal body 22. The raised rib, as shown in FIGS. 2 and 4, has a generally semicircular cross section in the preferred embodiment. As shown clearly in FIGS. 2 and 4, the raised rib 36 is located between the inner wall 24 and outer wall 26 along the first side 28 of the main seal body 22. Raised Rib 36 has a generally semi-circular cross section. The raised rib 36 may be of other cross sectional shapes such as square, rectangular triangular or frustoconical.

Figure 6:
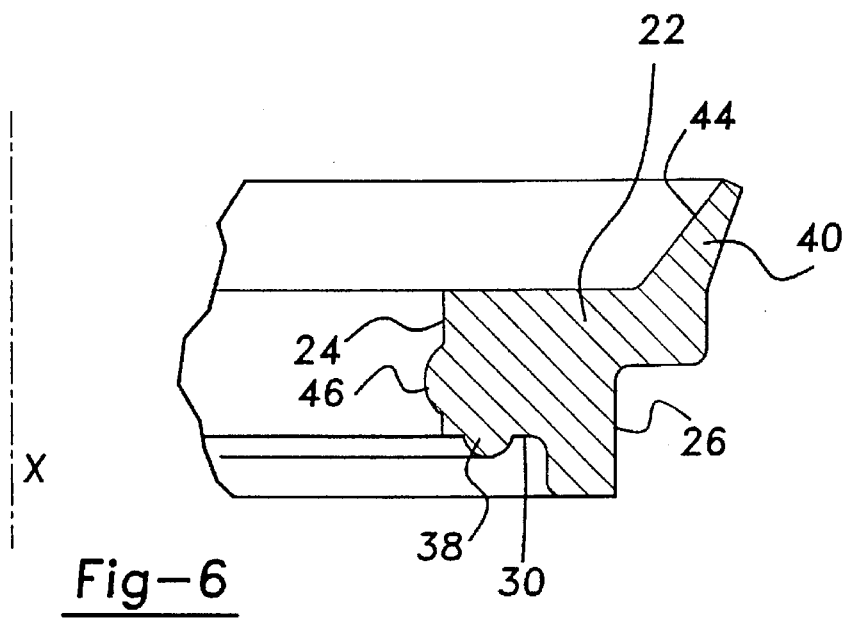
FIG. 6 is a cross sectional view of an alternative seal of the present invention.

Referring to FIG. 6 there is shown an alternative embodiment of the present invention wherein a raised rib 38 is shown on second side 30 of the main seal body 22. Raised rib 38 is disposed between inner wall 24 and outer wall 26 of main seal body 22. The raised rib 38 has a generally semi-circular cross section. The raised rib may be of other cross sectional shapes such as square, rectangular, triangular or frustoconical.

Referring back to FIG. 4, the main seal body 22 has extending radially out from outer wall 26, a flange seal portion 40. The flange seal portion 40 has a generally frustoconical cross sectional shape. The flange seal portion 40 extends away from the outer wall 26 and has an inner contacting surface 42 adapted to contact the constant velocity joint outer race 14 as shown clearly in FIG. 2. The flange seal portion 40, creates the necessary sealing contact between the seal 10 and transfer case output component 12, as shown. In the alternative embodiment shown in FIG. 6, there is shown an identical flange seal portion 44.

The main seal body 22 further includes a generally annular shoulder 46 which extends radially inwardly toward the central axis of rotation X of seal 10. The generally annular shoulder 46 is deformable in a direction perpendicular to inner wall 24 of main seal body 22. Generally annular shoulder 46, when deformed, creates a compression force which assists in holding the inner wall 24 and therefore the main seal 10 to the transfer case output component 12.

The seal 10 of the present invention, in the preferred embodiment, is comprised of a resilient elastomeric material. It is contemplated that the seal of the present invention may be made of any elastomeric material which has an appropriate resiliency and is able to provide an adequate seal between the constant velocity joint outer race 14 and the transfer case output component 12. An example of an appropriate elastomeric materials is Nitrile rubber or Polybutadiene-coacrylonitrile. Nitrile Rubber is a solvent resistant copolymer rubber suitable for use as a material for the present invention.

Figure 5:
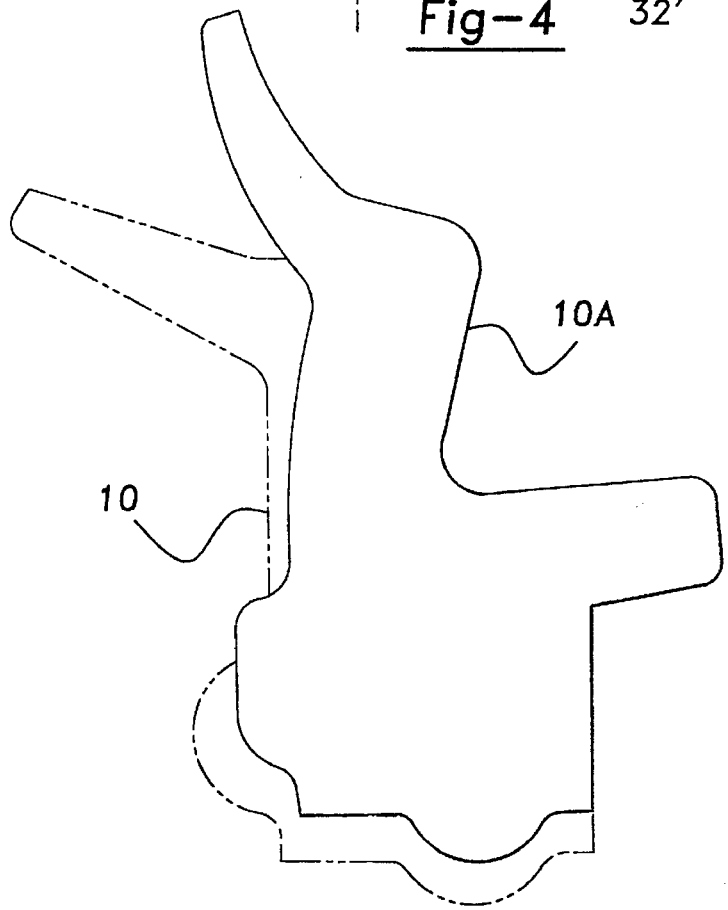
FIG. 5 is a cross sectional view of a seal of the present invention illustrating the deformable characteristics of the present invention.

Referring now to FIG. 5, there is shown the seal 10 of the present invention shown in two different states. Seal 10, as shown, is in the non-deformed state and seal 10A is shown in the deformed state as it would be in operation disposed between the transfer case output component 12 and the constant velocity joint outer race 14 as shown in FIG. 2. Further, the main seal body is shown with the flange seal portion 40 deformed downwardly and outwardly as in operation again as shown in FIG. 2. Lastly, the interconnecting surface 42 is further shown in its deformed operable state.

In its deformed operable state, the raised rib is axially deformable in operation such that it can create an axial force of approximately 5 to 45 lbs. between the constant velocity joint outer race 14 and the transfer case output component 12 forcing the outer race 14 and output component 12 apart. This axial force is created by a deformation of the raised rib to approximately one half of its non-deformed height. The axial force may be raised or lowered by changing the size and shape of the raised rib 36. It should be noted that the size and shape of the seal 10 of the present invention is directly related to the size and shape of the constant velocity joint 16 and transfer case output component 12 according to the design constraints of the particular vehicle. As the size and shape of the constant velocity joint 16 and transfer output component are altered, the seal 10 of the present invention would also have to be altered. This axial force effectively eliminates any axial slip between the transfer case output component 12 and the constant velocity joint 16 by forcing the constant velocity joint 16 and transfer case output component 12 apart.

This reduction in axial slip provides for the following advantages. The reduction in axial slip reduces or eliminates the unwanted point contact between the constant velocity joint and the transfer case output component in hard braking situations. This translates into reduced wear for the constant velocity joint and transfer case output component interface points 50 and 52, respectively, over time. Further, the reduction or elimination of axial play between the constant velocity joint 16 and transfer case output component 12 reduces the noise vibration and harshness characteristics of the connection between the constant velocity joint and the transfer case component.

Figure 7:
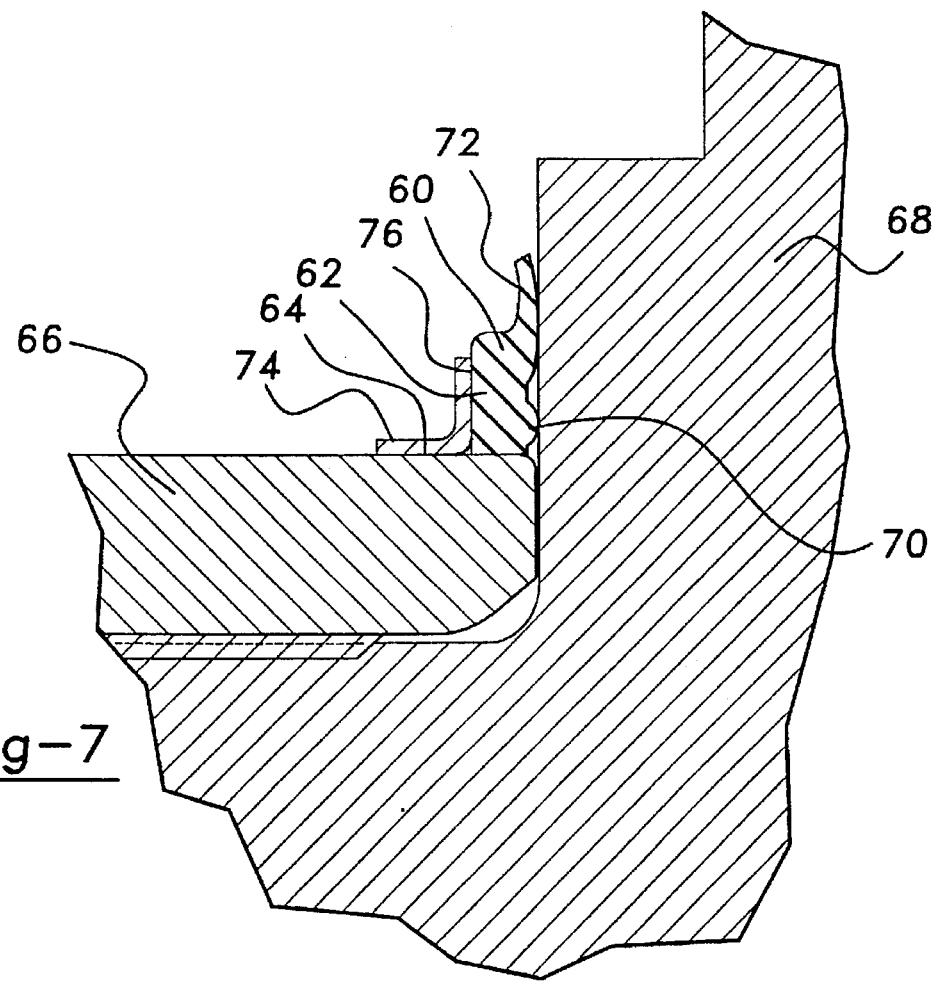
FIG. 7 is a cross sectional view of an alternative seal of the present invention and alternative transfer case output component.

FIG. 7 discloses an alternative seal 60 of the present invention. The seal 60 includes an elastomeric portion 62 and a rigid portion 64. Rigid portion 64 may be made of metal, such as steel or hard plastic capable of providing a rigidity to the seal 60. The seal 60 is shown connected to an alternative transfer case output component 66 and a constant velocity joint 68.

Seal 60 includes a raised rib 70 and flange seal portion 72 that operates as described previously. Rigid portion 64 is press fit over transfer case output component 66. Rigid portion 64 includes a cylindrical section 74 and flat section 76. In this fashion, cylindrical section 74 and flat section 76 operate to provide added rigidity to the connection between the seal 60 and transfer case output component 66, such that the seal does not turn back on itself.

Figure 8:
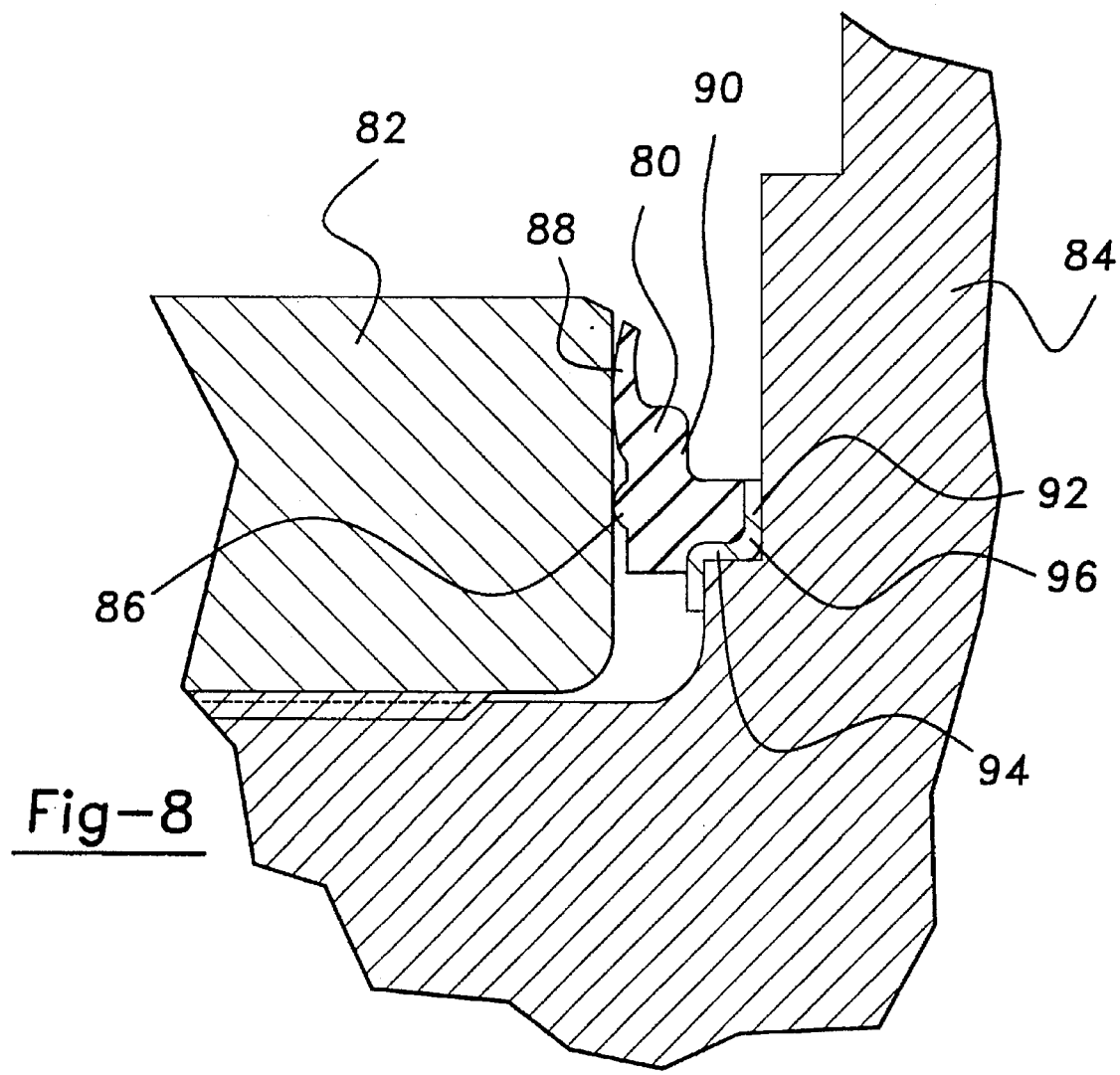
FIG. 8 is a cross sectional view of another alternative seal of the present invention and alternative transfer case output component.

FIG. 8 discloses yet another alternative seal 80 of the present invention. Seal 80 is shown disposed between an alternative transfer case output component 82 and an alternative constant velocity joint 84. Seal 80 includes a raised rib 86 and flange seal portion 88. The raised rib 86 and flange seal portion 88 operate as described previously. The seal 80 includes an elastomeric portion 90 and a rigid portion 92. Rigid portion 92 may be made of metal, such as steel or hard plastic capable of providing a rigidity to the seal 80. The seal 80 is shown connected to an alternative transfer case output component 82 and a constant velocity joint 84.

Rigid portion 92 is press fit over the constant velocity joint 84. Rigid portion 92 includes a cylindrical section 94 and flat section 96. In this fashion, cylindrical section 94 and flat section 96 operate to provide added rigidity to the connection between the seal 80 and the constant velocity joint 84.

The best mode for carrying out the invention has been described in detail, those familiar with the art to which this invention relates will recognize various alternative designs and embodiments for practicing the invention as defined by the following claims.

What is claimed is:

1. A seal for a constant velocity joint, said seal comprising:
   a main seal body having a central axis of rotation, said main seal body including an inner wall and an outer wall and opposing first and second sides, said inner wall defining a connecting region having a generally cylindrical portion for connecting said seal to a transmission output component;
   a raised rib extending out from said first side, said raised rib being deformable in a direction parallel to said central axis of rotation in such a manner as to create an axial force parallel to said central axis of rotation for reducing the axial slip between a constant velocity joint and said transmission output component by forcing said constant velocity joint and said transmission output component away from each other; and
   a flange seal portion extending out away from said outer wall, said flange seal portion having an inner contacting surface abutting said constant velocity joint and defining a protective seal between said constant velocity joint and said transmission output component wherein said flange seal portion is deformable in a direction downwardly and outwardly to create an additional axial force parallel to said central axis of rotation.

2. The seal of claim 1 wherein said raised rib has a generally semicircular cross section.

3. The seal of claim 1 wherein said raised rib is located between said inner and outer walls.

4. The seal of claim 1 wherein said flange seal portion has a generally frustoconical shape.

5. The seal of claim 1 wherein said raised rib is axially deformable in operation such that an axial force in a range from approximately 5 to 45 lbs. is generated between said constant velocity joint and said transmission output component.

6. The seal of claim 1 wherein said inner wall further includes a generally annular shoulder which extends radially inwardly toward said central axis of rotation.

7. The seal of claim 6 wherein said generally annular portion is deformable in a direction perpendicular to said inner wall such that a compression force in created which assists in connecting said inner wall to said transmission output component.

8. A seal for a constant velocity joint having an outer race, said seal comprising:
   a main seal body having a central axis of rotation, said main seal body including an inner wall and an outer wall and opposing first and second sides, said inner wall defining an opening through which a transfer case output component is disposed, said inner wall also having a connecting region having a generally cylindrical portion for connecting said seal to said transfer case output component;
   a raised rib extending out from said first side, said raised rib being axially deformable in a direction parallel to said central axis of rotation in such a manner as to create an axial force parallel to said central axis of rotation for reducing the axial slip between said outer race of said constant velocity joint and said transfer case output component by forcing said outer race and said transfer case output component away from each other, wherein said raised rib is located between said inner and outer walls; and a flange having an inner contacting surface adapted to contact said outer race and define a protective seal between said constant velocity joint and said transfer case output component wherein said flange seal portion is deformable in a direction downwardly and outwardly to create an additional axial force parallel to said central axis of rotation.

9. The seal of claim 1 wherein said raised rib has a generally semicircular cross section.

10. The seal of claim 1 wherein said flange seal portion has a generally frustoconical shape.

11. The seal of claim 1 wherein said raised rib is axially deformable in operation such that an axial force in a range from approximately 5 to 45 lbs. is generated between said constant velocity joint and said transmission output component.

* * * * *

UNITED STATES PATENT AND TRADEMARK OFFICE
CERTIFICATE OF CORRECTION

PATENT NO. : 5,639,099

FILE DATE : June 17, 1997

INVENTOR(S): Booker, et al

It is certified that error appears in the above-identified patent and that said Letters Patent is hereby corrected as shown below:

Column 1, Line 42, insert --,-- after "specifically".
Column 4, Line 26, insert --,-- after "retangular".

Signed and Sealed this

Fourteenth Day of October, 1997

*Attest:*

BRUCE LEHMAN

*Attesting Officer*     Commissioner of Patents and Trademarks